US009645405B2

(12) United States Patent
Wu

(10) Patent No.: US 9,645,405 B2
(45) Date of Patent: May 9, 2017

(54) DOUBLE-VISION DISPLAY SYSTEM

(75) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 854 days.

(21) Appl. No.: 13/109,252

(22) Filed: May 17, 2011

(65) Prior Publication Data
US 2011/0285834 A1 Nov. 24, 2011

(30) Foreign Application Priority Data
May 18, 2010 (CN) .......................... 2010 1 0180959

(51) Int. Cl.
G02B 27/26 (2006.01)
G02F 1/1343 (2006.01)
G02B 27/28 (2006.01)
G02B 27/22 (2006.01)
H04N 13/04 (2006.01)

(52) U.S. Cl.
CPC ............. *G02B 27/26* (2013.01); *G02B 27/22* (2013.01); *G02B 27/28* (2013.01); *G02B 27/286* (2013.01); *G02B 27/288* (2013.01); *G02F 1/1343* (2013.01); *G02F 1/134309* (2013.01); *H04N 13/0434* (2013.01); *G02F 2001/134372* (2013.01); *H04N 2013/0463* (2013.01)

(58) Field of Classification Search
CPC .... G02B 27/26; G02B 27/286; G02B 27/288; H04N 13/0434; G02F 1/1343; G02F 1/134309; G02F 1/134372
USPC .......................................................... 348/58
See application file for complete search history.

(56) References Cited

U.S. PATENT DOCUMENTS

| 4,870,486 A * | 9/1989 | Nakagawa et al. ............. 349/15 |
| 5,963,371 A | 10/1999 | Needham et al. |
| 6,046,849 A * | 4/2000 | Moseley et al. ............... 359/465 |
| 7,579,204 B2 * | 8/2009 | Nemoto .......................... 438/35 |
| 7,728,789 B2 * | 6/2010 | Jung et al. ....................... 345/32 |
| 8,089,569 B2 * | 1/2012 | Hoshi .................. G02B 5/3083 349/117 |
| 2005/0259189 A1* | 11/2005 | Bouten ............... G02F 1/13394 349/1 |

(Continued)

FOREIGN PATENT DOCUMENTS

| CN | 101339310 A | 1/2009 |
| CN | 101359117 A | 2/2009 |
| CN | 101551984 A | 10/2009 |

OTHER PUBLICATIONS

Partial machine translation of CN 101551984 A.*

(Continued)

Primary Examiner — David N Werner
(74) Attorney, Agent, or Firm — Ladas & Parry LLP

(57) ABSTRACT

A double-vision display system comprises: a display displaying by periodically switching in at least two images or displaying region-alternately and simultaneously the at least two images in an array area according to inputted video streaming; a polarization modulation device disposed in front of the display and modulating emitted light of the at least two images into kinds of polarized light having different polarization directions; and at least two pairs of polarization spectacles, polarization direction of each pair of polarization spectacles being the same as the polarization direction of one kind of the polarized light.

5 Claims, 3 Drawing Sheets

(56) References Cited

U.S. PATENT DOCUMENTS

| | | | |
|---|---|---|---|
| 2006/0066792 A1* | 3/2006 | Oh | G02F 1/1323 349/123 |
| 2007/0040905 A1* | 2/2007 | Vesely | H04N 13/0434 348/58 |
| 2007/0043466 A1* | 2/2007 | Vesely | G02B 5/201 700/166 |
| 2007/0195410 A1* | 8/2007 | Yun | G02B 27/2214 359/464 |
| 2007/0222927 A1* | 9/2007 | Uehara | G02F 1/133634 349/117 |
| 2008/0002079 A1* | 1/2008 | Kimura | G02B 6/0051 349/42 |
| 2008/0068523 A1* | 3/2008 | Mitsui | G02F 1/133555 349/37 |
| 2009/0085894 A1* | 4/2009 | Gandhi | G06F 3/041 345/175 |
| 2009/0141201 A1* | 6/2009 | Yeh et al. | 349/15 |
| 2009/0262268 A1* | 10/2009 | Matsumoto | G02B 5/3083 349/15 |
| 2009/0326086 A1* | 12/2009 | Xu | B01J 20/261 521/99 |
| 2010/0182520 A1* | 7/2010 | Yun | G02B 27/2214 349/15 |
| 2011/0102714 A1* | 5/2011 | Lee | G02F 1/133514 349/105 |
| 2013/0182205 A1* | 7/2013 | Hibayashi | G02B 5/201 349/106 |
| 2014/0098335 A1* | 4/2014 | Kamada | G02F 1/134309 349/142 |

OTHER PUBLICATIONS

Human translation of portion of CN 101551984 A.*
The Merriam-Webster Collegiate Dictionary 886, 1162 (10th Ed. 2001).*

* cited by examiner

DOUBLE-VISION DISPLAY SYSTEM

BACKGROUND

An embodiment of the present invention relates to a double-vision display system.

In nowadays life, displays have become important apparatuses. In practical usage, a demand of simultaneously watching two or more images exists. For example, it is possible that only one TV set is provided in one living room, but different family numbers wants to watch different TV programs at the same time. One way to resolve this problem is to display many images in separate regions on a same display device, but in such way the pictures are proportionally reduced, which leads to the disadvantageous influence on the viewing effect.

SUMMARY

An embodiment of the present invention provides a double-vision display system comprising: a display displaying by periodically switching in at least two images or displaying region-alternately and simultaneously the at least two images in an array area according to inputted video streaming; a polarization modulation device disposed in front of the display and modulating emitted light of the at least two images into kinds of polarized light having different polarization directions; and at least two pairs of polarization spectacles, polarization direction of each pair of polarization spectacles being the same as the polarization direction of one kind of the polarized light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Embodiments of the present invention now will be described more fully hereinafter with reference to the accompanying drawings, in which the embodiments of the invention are shown, but only some embodiments of the present invention are described here. Other embodiments completed by those skilled in the relevant art based on the embodiments disclosed herein without any inventive work all fall within the protection scope of the present invention.

Stereoscopic display has become one of important development trends in display fields. One of the basic principles of stereoscopic display is that a stereoscopic image is generated based on the parallax, that is to say, an image for the right eye enters the right eye and an image for the left eye enters the left eye. The image for the right eye and the image for the left eye is a pair of stereoscopic images having the parallax. One method to achieve the stereoscopic display is a time serial manner, in which at a first time slot a display device displays a image for the left eye, when only the left eye of a viewer can see this left-eye image, and at a second time slot, the display device displays a image for the right eye, when only the right eye of a viewer can see this right-eye image, and thus a stereovision can be generated. Another method to achieve the stereoscopic display is a parallel manner, in which at the same time a display device displays a image for the left eye and a image for the right eye alternately in different regions, and preferably, the images are displayed precisely in pixel level, and thus, the right eye and the left eye of a viewer can respectively see the image for the right eye and the image for the left eye so as to achieve the stereoscopic display.

A technical solution of an embodiment of the present invention is to achieve a double-vision display.

Figure 1:
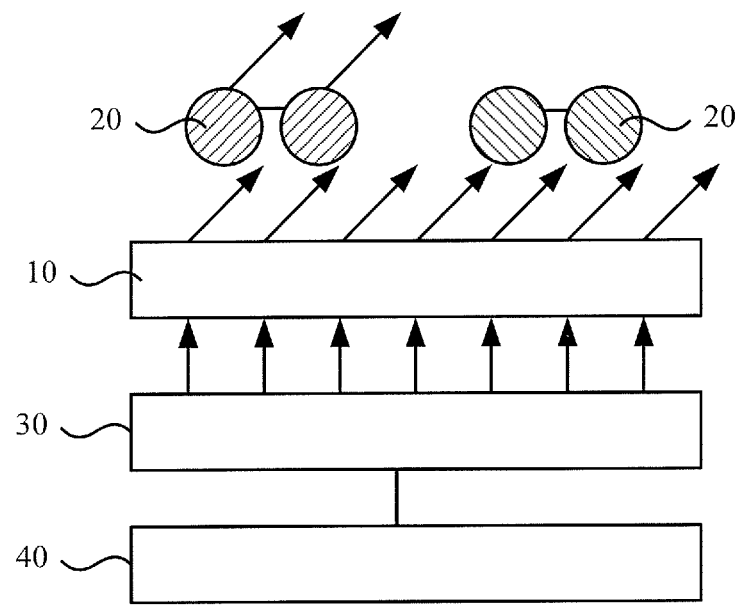
FIG. 1 is a schematic structural view of a double-vision display device according to a first embodiment of the present invention.

FIG. 1 is a schematic structural view of a double-vision display system according to a first embodiment of the present invention, and the double-vision display system includes a polarization modulation device 10 and at least two pairs of polarization spectacles 20. The polarization modulation device 10 is disposed between a display device 30 and a viewer; the display device 30, based on inputted video streaming, displays by periodically switching in at least two images or simultaneously displays at least two images in alternate regions in an array area; and the polarization modulation device 10 modulates light of the at least two images into different kinds of polarized light having different polarization directions. Among the pairs of polarization spectacles, two eyeglasses of each pair of polarization spectacles have the same polarization direction, which is the same as the polarization direction of one kind of the polarized light.

In practice, video streaming for two images can be hybrid encoded, such that the display device 30 can display by periodically switching in at least two images or simultaneously display at least two images in alternate regions in an array area; for example, the display device 30 displays images from two TV channels, respectively. The hybrid encoding of video streaming can be performed by a video streaming source, for example, a server for providing video streaming. Alternatively, the double-vision display device may further include a video streaming hybrid encoding device 40. The video streaming hybrid encoding device 40 is connected with the display device 30 and hybrid encodes various kinds of video streaming to be supplied to the display device 30, such that the display device 30 can display by periodically switching in at least two images or simultaneously display at least two images in alternate regions in an array area. The video streaming hybrid encoding device 40 can be integrated into the display device 30 or a set-top box, or can be a separate device, and can hybrid encode the conventional video streaming to meet a displaying demand of double-vision display of the embodiment of the invention.

The display device can display at least two images, and the display periodically switches in at least two images or simultaneously displays at least two images in alternate regions in an array area as an example. Polarized light having the different polarization directions comprises a first polarized emitted light and a second polarized emitted light respectively. The first polarized emitted light and the second polarized emitted light may be two linearly polarized lights having the polarization directions perpendicular to each other, and correspondingly the eyeglasses of the polarization spectacles have gratings whose directions are perpendicular to each other. Alternatively, the first polarized emitted light and the second polarized emitted light may be respectively a left-hand elliptically polarized light and a right-hand elliptically polarized light having opposite polarization directions, and correspondingly the eyeglasses comprise a left-hand elliptically polarizer and a right-hand elliptically polarizer. By using two polarization directions, a crosstalk between polarized lights can be suppressed.

Figure 2:
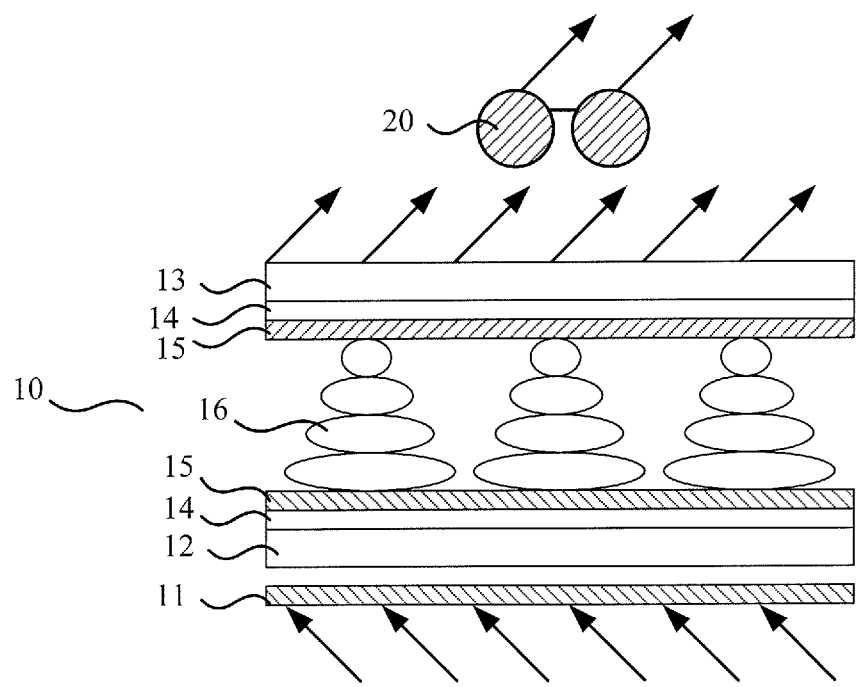
FIG. 2 is a schematic structural view of a polarization modulation device according to the first embodiment of the present invention.
Figure 3:
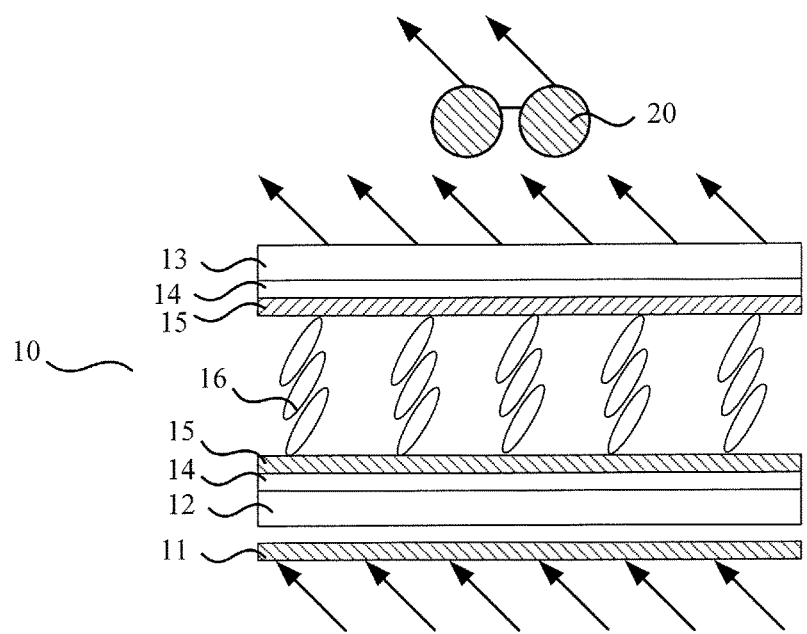
FIG. 3 is another schematic structural view of the polarization modulation device according to the first embodiment of the present invention.

FIG. 2 and FIG. 3 are schematic structural views of a polarization modulation device according to a first embodiment of the present invention, and this polarization modulation device 10 is adapted to the display device which displays by periodically switching between two images. The polarization modulation device 10 includes a polarizer 11, a first transparent substrate 12 and a second transparent substrate 13. The polarizer 11 is disposed between a display device and the first transparent substrate 12 and modulates light from the display device into polarized light having the same polarization direction as that of the polarizer 11. Two transparent conductive films 14 are respectively formed on opposite surfaces of the first transparent substrate 12 and the second transparent substrate 13. Two alignment films 15 are further respectively arranged on opposite surfaces of the two transparent conductive films 14. A first angle may be formed between alignment grooves of the two alignment films 15 and the first angle is preferably 90°, or the alignment grooves of the two alignment films 15 may be parallel to each other. A liquid crystal layer 16 is filled between the two alignment films 15 on the two substrates 12 and 13. Spacers are disposed between the two transparent substrates 12 and 13 to maintain a thickness of the polarization modulation device. The liquid crystal layer 16 is sealed between the two transparent substrates 12 and 13 by using seal glue or the like. Orientation of alignment grooves on the first transparent substrate 12 may be the same as or different from the polarization direction of the polarizer 11, such that polarized modulating light emitted from the polarizer 11 can enter the first transparent substrate 12 and is transmitted to the liquid crystal layer 16. The liquid crystal layer 16 is periodically twisted in synchronism with periodically switching between the two images of the display device under the driving of a switching signal supplied to the transparent conductive film 14.

Liquid crystal molecular can twist in electric field, and under the electric field formed by the two transparent conductive films 14, liquid crystal molecular in the liquid crystal layer 16 twist and rotate the inputted polarized light to a certain degree, such that the polarization direction of the polarized light which exits is changed. The orientation of the alignment grooves of the alignment film 15 determines an original twisting angle of the liquid crystal molecular, and when the electric field applied according to a switching signal is an OFF state at a low voltage, liquid crystal molecular are maintained at the original twisting angle; when the electric field applied according to the switching signal is an ON state at a high voltage, liquid crystal molecular overcome the confinement of the alignment grooves under the electric filed and twists to a certain angle. The magnitude of the twisting angle depends on the magnitude of the electric field and the property of the liquid crystal. Thus, the polarization modulation device 10 can modulate light into two polarized light with the different polarization directions having a certain angle therebetween. FIG. 2 and FIG. 3 show two kinds of polarized light having different polarization directions perpendicular to each other, and is each adapted to one of two pairs of different polarization spectacles 20, respectively.

Eyeglasses of each pair of the polarization spectacles include polarizers, and polarization directions of two eyeglasses are identical and are the same as the polarization direction of one kind of polarized light, and thus, each pair polarization spectacles only allow polarized light with the same polarization direction as that of its eyeglasses to be transmitted or pass. By using one pair of polarization spectacles, the viewer can only watch one image, and thus, a plurality of viewer who wears different polarization spectacles can see different images at the same time period. When switching frequency of various images is higher, the viewer would not sense the switching between various images due to visual persistence but feels a continuous image.

Figure 4:
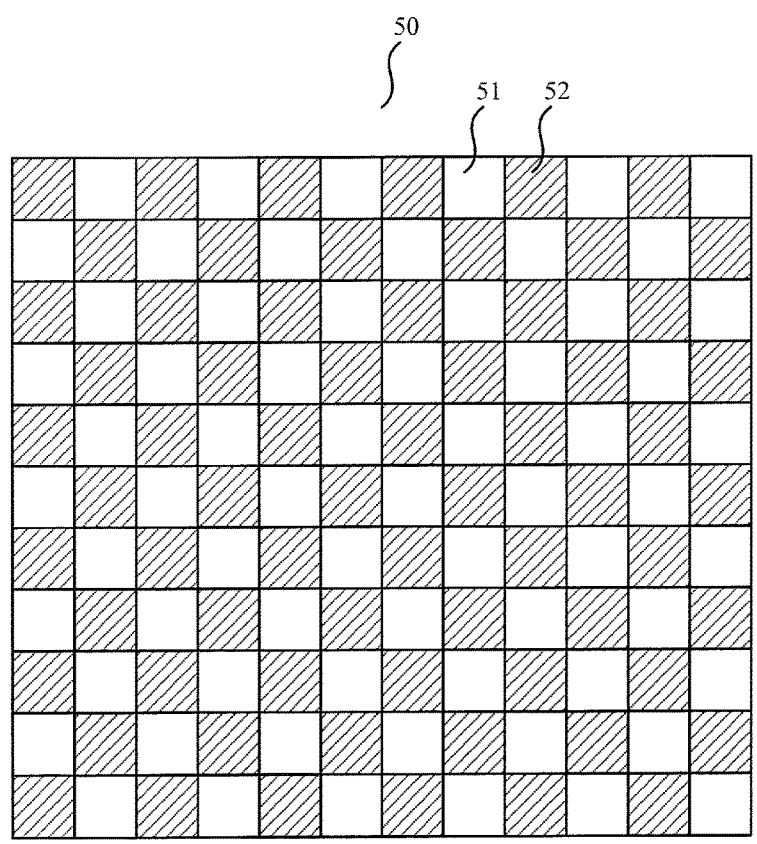
FIG. 4 is a schematic structural view of a phase difference plate in a polarization modulation device of a double-vision display device according to a second embodiment of the present invention.

FIG. 4 is a schematic structural view of a phase difference plate in a polarization modulation device of a double-vision display device according to a second embodiment of the present invention, and the polarization modulation device is adapted to a display that displays region-alternately and simultaneously two images in an array area. The polarization modulation device includes a polarizer (not shown) and a phase difference plate 50; the polarizer is disposed between the display and the phase difference plate 50 and modulates light emitted from the display into polarized light. The phase difference plate 50 includes a third transparent substrate (not shown). On the third transparent substrate, first polarization modulation regions 51 and second polarization modulation regions 52 are alternately formed, and the first polarization modulation regions 51 and the second polarization modulation regions 52 respectively correspond to two different kinds of regions of the display for separately displaying two images, and the first polarization modulation regions 51 module polarized light from one of the two images to form first polarized light, and the second polarization modulation regions 52 modulate polarized light from the other of the two images to form second polarized light. Preferably, the first polarization modulation regions 51 are zero phase difference regions, and the second polarization modulation regions 52 are half-wavelength phase difference regions.

The phase difference plate is an optical element, and an exemplary phase difference plate uses a transparent substrate, such as glass substrate, and has a phase different thin formed thereon. The phase different thin film include a zero phase difference region thin film and a half-wavelength phase difference region thin film, and two kinds of regions have different optical properties and can be formed in a stripe shape and alternatively arranged, or may be formed in block shape and alternately arranged in a matrix, and the arrangement precision can reach the pixel level. Light emitted from the display is modulated into polarized light having a predetermined direction after transmitted through the polarizer, and then the polarized direction of a portion, transmitting through the half-wavelength phase difference region, of the polarized light is not changed, and the polarized direction of another portion, transmitting through the half-wavelength phase difference region, of the polarized light rotates 90°, and the polarized emitted light corresponding to each image has its own uniform polarization direction. As long as signals for one image are inputted into the pixels corresponding to the zero phase difference region and signals for the other image are inputted into the pixels corresponding to the half-wavelength phase difference region, a viewer wearing a pair of polarized spectacles whose two eyeglasses have the same polarized direction as that of the polarized emitted light corresponding to one image can watch the one image only. If the display regions for two images are divided to a certain level (e.g., pixel level), a double-vision display can be achieved.

Figure 5:
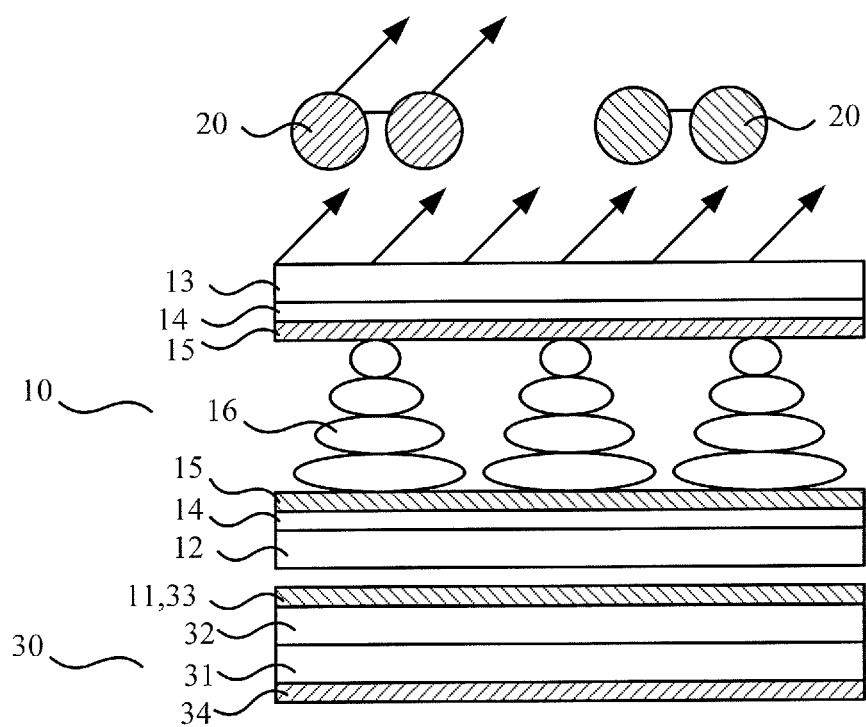
FIG. 5 is a schematic structural view of a double-vision display system according to a third embodiment of the present invention.

FIG. 5 is a schematic structural view of a double-vision display system according to a third embodiment of the present invention. The double-vision display system includes a display device 30 and a double-vision display device according to any embodiment of the present invention, and the double-vision display device is attached to a light emitting side of the display device 30. The display device 30 can be any conventional display device, such as a liquid crystal display, an organic light-emitting display, or a plasma display device.

In the present embodiment, preferably, the display device 30 displays by periodically switching in two images, and the polarization modulation device 10 includes a polarizer 11, a first transparent substrate 12 and a second transparent substrate 13. The polarizer 11 is disposed between the display device 30 and the first transparent substrate 12 and modulates light emitted from the display device 30 into polarized emitted light. Two transparent conductive films 14 are respectively formed on opposite surfaces of the first transparent substrate 12 and the second transparent substrate 13; two alignment films 15 are further respectively arranged on opposite surfaces of the two transparent conductive films 14. A liquid crystal layer 16 is filled between the two alignment films 15, and liquid crystal in the liquid crystal layer 16 is periodically twisted in synchronism with periodically switching in the two images of the display device 30 under the driving of signals supplied to the transparent conductive film 14.

Further, the display device 30 is preferably a liquid crystal display panel, which includes an array substrate 31 and a color filter substrate 32 bonded together. An upper polarizer 33 and a lower polarizer 34 are respectively attached to outside of the array substrate 31 and the color filter substrate 32. At this time, the upper polarizer 33 on the color filter substrate 32 may be directly used as the polarizer 11 of the polarization modulation device 10 as described above. Thus, the integration degree of the double-vision display system can be improved.

Figure 6:
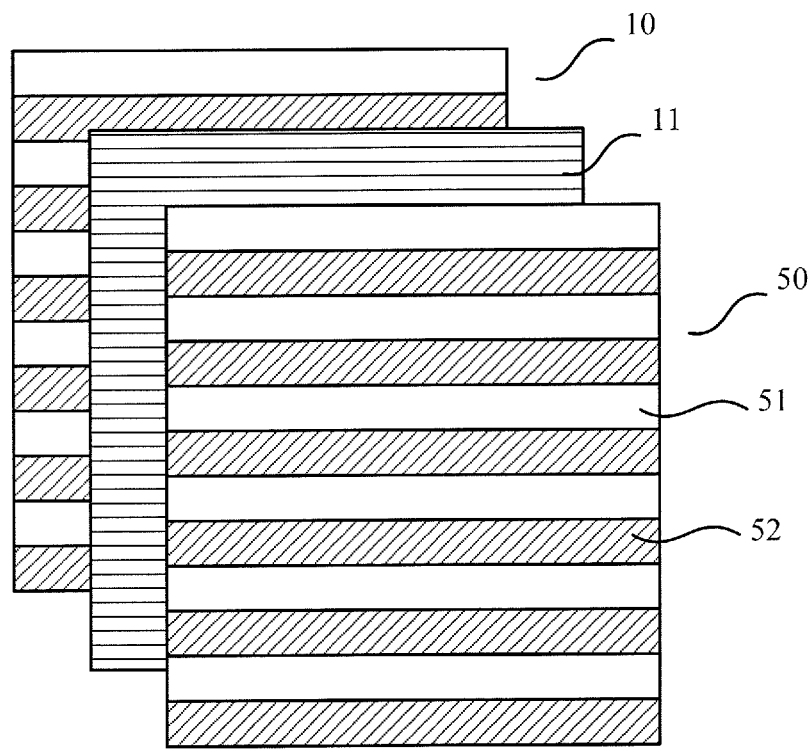
FIG. 6 is a schematic structural view of a double-vision display system according to a fourth embodiment of the present invention.

FIG. 6 is a schematic structural view of a double-vision display system according to a fourth embodiment of the present invention. The double-vision display system includes a display device 30 and a double-vision display device according to any embodiment of the present invention, and the double-vision display device is attached to a light emitting side of the display device 30. The display device 30 may be any conventional display device, such as a liquid crystal display, a plasma display panel (PDP), an organic light emitting diode display and the like.

Preferably, in the present invention, the polarization modulation device 10 includes a polarizer 11 and a phase difference plate 50; the polarizer 11 is disposed between the display device 30 and the phase difference plate 50 and modulates light emitted from the display device 30 into polarized emitted light. The phase difference plate 50 includes a third transparent substrate, on which first polarization modulation regions 51 and second polarization modulation regions 52 are alternately formed and the first polarization modulation regions 51 and the second polarization modulation regions 52 respectively correspond to two kinds of different regions of the display device 30 for separately displaying two images. The first polarization modulation regions 51 module polarized emitted light corresponding to one image further to form first polarized emitted light, and the second polarization modulation regions 52 modulate polarized emitted light corresponding to the other image further to form second polarized emitted light. Preferably, the first polarization modulation regions 51 are zero phase difference regions, and the second polarization modulation regions 52 are half-wavelength phase difference regions.

In a similar example, the display device 30 can be a liquid crystal display panel, and the upper polarizer outside of the color filter substrate of the liquid crystal display can be used also as the polarizer 11 of the polarization modulation device. Thus, the integration degree of the double-vision display system may be improved.

In above embodiments of the present invention, by disposing a polarization modulation device in front of a display, polarization direction of light emitted from the display can be controlled, such that different viewer wearing the polarization spectacles having the different polarization direction can see different image. When various images are region-alternately displayed in an array area, each image is alternately showed in an array form, that is, each image is divided into a plurality of stripes or in a matrix, such as a plurality of blocks, and thus, the overall size of the images will not be reduced, and viewing effect can be ensured. The cost of the double-vision display system is low, and a double vision effect can be achieved by the polarization spectacles without an additional control circuit.

The technical solution of the embodiments can be not only adapted to display images in a serial manner but also to a double-vision displaying using polarization spectacles in a parallel manner.

The above description only describes detailed embodiments of the present invention, and it is not a limitation of the protection scope of the present invention. Accordingly, it should be understood that many modifications or alternation which can be made easily by those of ordinary skill in the art within the disclosure of the present invention, will fall within the scope of the present invention as defined by the appended claims.

What is claimed is:

1. A double-vision display system, comprising:
    a display displaying by displaying region-alternately and simultaneously the at least two images in an array area according to inputted video streaming;
    a polarization modulation device disposed in front of the display and modulating emitted light of the at least two images into kinds of polarized light having different polarization directions; and
    at least two pairs of polarization spectacles, polarization direction of each pair of polarization spectacles being the same as the polarization direction of one kind of the polarized light, wherein
the polarization modulation device includes:
  a polarizer,
  a first transparent substrate, and
  a second transparent substrate,
    wherein the polarizer is disposed between the display and the first transparent substrate and modulates emitted light of the display into polarized emitted light,
    the second transparent substrate is disposed at a side opposite to the polarizer of the first transparent substrate,
    two transparent conductive films are respectively formed on opposite surfaces of the first transparent substrate and the second transparent substrate,
    two alignment films are further respectively arranged on opposite surfaces of the two transparent conductive films, and
    a liquid crystal layer is filled between the two alignment films and liquid crystal in the liquid crystal layer is periodically twisted in synchronism with periodically switching in the at least two images of the display under driving of a switching signal supplied to the transparent conductive films;
  from the first transparent substrate side, the polarization modulation device comprising the first transparent substrate, the transparent conductive film, the alignment film, the liquid crystal layer, the alignment film, the transparent conductive film and the second transparent substrate in this order,
wherein the two transparent conductive films respectively formed on the opposite surfaces of the first transparent substrate and the second transparent substrate are plane-shaped,
wherein the two transparent conductive films continuously cover the opposite surfaces of the first transparent substrate and the second transparent substrate, respectively,
wherein the display displays region-alternately and simultaneously the at least two images in a matrix form of a block shape,
wherein in each row of display regions of the display, the at least two images are displayed region-alternately and simultaneously, and in each column of the display regions of the display, the at least two images are displayed region-alternately and simultaneously,
wherein the display is a liquid crystal display, the liquid crystal display includes an array substrate and a color filter substrate bonded together, the polarizer of the polarization modulation device is directly used as an upper polarizer on the color filter substrate, the liquid crystal display and the polarization modulation device share the polarizer.

2. The double-vision display system as claimed in claim 1, wherein the display displays two images, and the polarized light having different polarization directions comprises first polarized emitted light and second polarized emitted light corresponding to the two images, respectively.

3. The double-vision display system as claimed in claim 2, wherein the first polarized emitted light and the second polarized emitted light are two kinds of linearly polarized lights having the polarization directions perpendicular to each other, respectively, or the first polarized emitted light and the second polarized emitted light are a left-hand elliptically polarized light and a right-hand elliptically polarized light having opposite polarization directions, respectively.

4. The double-vision display system as claimed in claim 1, further comprising:
  a video streaming hybrid encoding device, connected with the display and hybrid encoding all kinds of video streaming provided to the display such that the display displays by periodically switching in the at least two images or displays region-alternately and simultaneously the at least two images in the array region based on hybrid encoded video streaming.

5. The double-vision display system as claimed in claim 1, wherein the display comprises a liquid crystal display, a plasma display panel or an organic light emitting diode display.

* * * * *